(12) United States Patent
Fromson et al.

(10) Patent No.: US 6,479,430 B1
(45) Date of Patent: Nov. 12, 2002

(54) CATALYST PREPARATION

(75) Inventors: Howard A. Fromson, 49 Main St., Stonington, CT (US) 06378; William J. Rozell, Vernon, CT (US)

(73) Assignee: Howard A. Fromson, Stonington, CT (US)

( * ) Notice: Subject to any disclaimer, the term of this patent is extended or adjusted under 35 U.S.C. 154(b) by 1355 days.

(21) Appl. No.: 08/653,510

(22) Filed: May 24, 1996

Related U.S. Application Data

(63) Continuation-in-part of application No. 08/502,121, filed on Jul. 13, 1995, now Pat. No. 5,693,207.

(51) Int. Cl.[7] ............................ B01J 21/04; C25D 11/04
(52) U.S. Cl. ...................... 502/439; 502/355; 427/271; 427/305; 427/306; 427/405; 427/437; 205/112; 205/173
(58) Field of Search ................................. 427/271, 304, 427/305, 306, 405, 437; 205/112, 173; 502/355, 439

(56) References Cited

U.S. PATENT DOCUMENTS

| | | | | |
|---|---|---|---|---|
| 3,764,564 A | * | 10/1973 | Maselli et al. ............. 252/465 |
| 3,929,594 A | * | 12/1975 | Fromson ..................... 204/42 |
| 4,014,756 A | * | 3/1977 | Fromson ..................... 204/10 |
| 4,021,592 A | * | 5/1977 | Fromson ..................... 428/209 |
| 4,954,370 A | | 9/1990 | Mahmoud ................... 427/438 |
| 4,994,422 A | * | 2/1991 | Goldman ..................... 502/5 |
| 5,380,696 A | | 1/1995 | Sawada et al. ............ 502/313 |

* cited by examiner

Primary Examiner—Bekir L. Yildirim
(74) Attorney, Agent, or Firm—Alix, Yale & Ristas, LLP

(57) ABSTRACT

A substrate metal such as aluminum, usually in the form of a web, is anodized to form a porous oxide coating. A catalytic metal is then electrolytically deposited into the base of the pores preferably using an AC current. A portion of the oxide coating is then stripped away to expose the deposited catalytic metal at the surface of the remaining oxide layer. Alternately, a generally non-catalytic base metal may first be deposited followed by the deposition of the catalyst metal within the pores over the base metal. Further alternatives include stripping the oxide down to the base metal and then depositing the catalyst metal on the surface, further anodizing to form additional oxide between the deposited metal and the substrate, and enlarging the cross section of the base of the pores prior to the deposition of the metal.

13 Claims, 2 Drawing Sheets

CATALYST PREPARATION

This application is a continuation-in-part of U.S. patent application Ser. No. 08/502,121, filed Jul. 13, 1995, now U.S. Pat. No. 5,693,207.

FIELD OF THE INVENTION

This invention relates to a process for making an article suitable for use as a composite catalyst body. More particularly, it relates to a process whereby an aluminum substrate is anodized, a metal is electrolytically deposited at the base of the pores of the oxide, and the oxide is then partially stripped such that the deposited metal is exposed at the surface of the remaining oxide layer. The electrolytically deposited metal may be a catalytic metal or may be comprised of a base metal onto which a catalytic metal is deposited.

BACKGROUND OF THE INVENTION

The coloring of aluminum by anodizing to form a porous oxide and subsequently electrolytically depositing a metal within the pores is well known. A basic discussion can be found in "The Surface Treatment and Finishing of Aluminum and its Alloys" authored by S. Wernick, P. Pinner and P. G. Sheasby, fifth edition, copyrighted 1987 by Finishing Publications Ltd. and co-published in the United States with ASM International, Metals Park, Ohio, on pages 600 to 625 of volume 1. In such processes, a porous oxide film is first produced using direct current or alternating current in an anodizing electrolyte of the type known to produce such oxides. Examples of electrolytes would include sulfuric acid and phosphoric acid. The anodized carrier is subsequently treated electrolytically to deposit a metal within the pores of the oxide.

The deposited metals would include, for example, nickel and copper.

This is most often accomplished using alternating current and the electrolyte solution contains a salt of the metal to be deposited. The counter electrode may be either an inert material such as graphite or alternatively it may be, for example, a nickel or copper electrode. The metal is known to be deposited at the base of the pores in the oxide film.

U.S. Pat. Nos. 3,929,594 and 4,021,592 disclose an electroplated anodized aluminum article and a process for making such an article wherein an aluminum substrate has an unsealed porous layer formed on the substrate and then has a metal electrolytically deposited thereon to form discete metal islands having a root portion anchored in the pores of the oxide layer. The islands extend from the root portion above the surface of the oxide layer in a bulbous, undercut configuration. It is disclosed that the article in these patents can be a composite catalyst body by using a catalytically active metal to form the islands.

The previously mentioned co-pending patent application Ser. No. 08/502,121 discloses the formation of a catalytic surface wherein a base metal such as aluminum is anodized to form a porous unsealed oxide coating. Nodules are then formed on the surface with roots anchored in the pores of the coating by electrodepositing a relatively inexpensive core metal such that the nodules extend above the surface in a bulbous, undercut configuration. A second catalytic metal is subsequently electrodeposited onto the surface of the core metal nodules. The catalytically coated nodules are optionally removed from the oxide to form discrete catalyst coated particles.

SUMMARY OF THE INVENTION

The present invention is directed to the formations of a catalytic surface wherein an aluminum substrate is anodized to form a porous, unsealed oxide coating. A metal is then electrolytically deposited within the pores of the oxide, and the oxide is subsequently partially stripped to expose the metal deposit at the surface. In the case where the metal is a catalytically active metal, the article thus formed may serve as a composite catalyst body. Alternatively, the electroltic deposition process may be carried out in two stages where a base metal is first deposited within and closest to the base of the pores. A second, catalytically active metal is subsequently deposited within the pores on top of the base metal at the base of the pores. The oxide can then be sufficiently stripped to expose the catalytically active metal at the surface.

In an alternative embodiment, the metal deposited within the pores is a base metal. The oxide is then sufficiently stripped to expose the base metal at the surface. A catalytically active metal is then deposited onto the exposed base metal at the surface. This deposition of the catalytically active metal onto the base metal may be accomplished by electrolytic deposition or by electroless chemical plating. The deposition is typically carried out such that the catalytic metal sites remain separate and discrete. Alternatively, the deposition may be allowed to proceed such that the catalytic metal bridges the gaps between the base metal to cover the entire surface. The resultant article would thus have a catalyst layer over the entire surface anchored by the base metal roots in the pores.

The process of the invention may be further carried out with the inclusion of an additional anodizing process. After the metal is deposited into the pores, the substrate is then subjected to an additional anodizing process. Since the anodizing process produces the oxide at the interface between the aluminum and the oxide layer, this further oxidation occurs beneath the deposited metal. The article is then subjected to a partial stripping process such that the deposited metal is exposed at the surface.

Also, this second anodizing process may be carried out in an electrolyte such that the dissolution of the oxide layer in which the metal is deposited is caused to occur sufficiently such that the metal is exposed at the surface at the same time as additional oxide is being formed.

Further, the process of the present invention may optionally include the step of increasing the cross section of the pores at the region of the base prior to the electrolytic deposition of the metal.

Finally, the process of the invention may be carried out so as to form discrete catalytic particles.

DESCRIPTION OF THE PREFERRED EMBODIMENT

According to the first step of the present invention, a porous anodic oxide coating is formed on the surface of an aluminum plate, web or other shaped article. The aluminum article may be ungrained (smooth) or it may be roughened to form a pitted surface by conventional training techniques. The formation of porous oxide coatings in the anodizing process is well known in the art and is accomplished by using the electrolytes which are known to naturally result in porosity including, for example, sulfuric acid and phosphoric acid. The pore size of an unsealed anodic oxide coating on an aluminum article can be made to vary in diameter and depth by varying the anodizing conditions as is also known in the art. An anodic oxide will typically have pores in the range of about 50 to 300 Angstroms in diameter.

Figure 1:
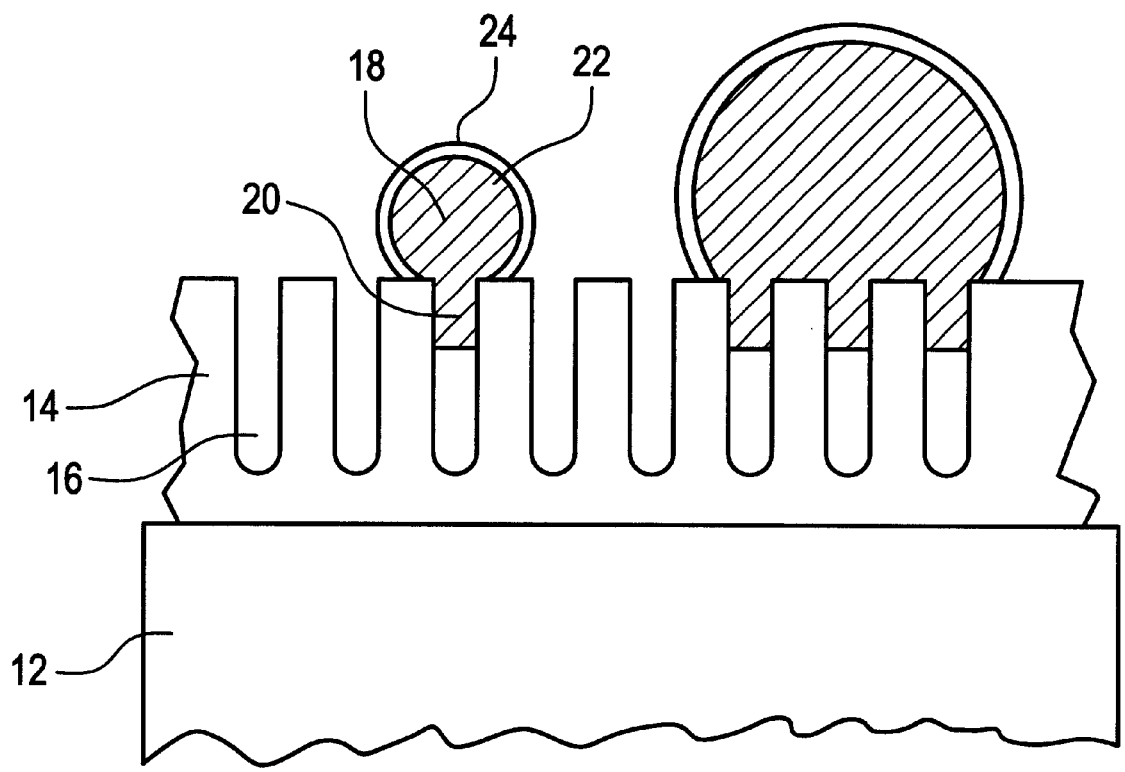
FIG. 1 is an enlarged cross-sectional view depicting a metal deposited over a porous anodic oxide layer on a metal base according to the prior process wherein bulbous nodules are formed above the oxide surface.

The anodized aluminum substrate is then subjected to an electrolytic treatment in which a metal is deposited within the pores. This electrolytic deposition process of the present invention is carried out in such a way that the deposit of the metal takes place at the base of the pores as contrasted to the formation of metal islands on the surface with a bulbous, undercut configuration extending above the surface and with root portions extending down into the pores such as disclosed in the prior U.S. Pat. Nos. 3,929,594 and 4,021,592. FIG. 1 illustrates the cross-section of a portion of an article formed according to that prior art process. The anodizable metal substrate 12 has an unsealed, porous anodic oxide layer 14 formed thereon with a pore being shown at 16. Electrolytically deposited metal is deposited on the surface of the anodic layer 14 to form the nodule designated 18 having a root portion 20 extending into the pore and a head portion 22 extending above the anodic layer 14. The head portion 22 can then have a catalyst metal 24 deposited thereon.

The depiction of the prior art process as illustrated in FIG. 1 contrasts somewhat with the depiction as illustrated in the prior art documentation. Previously, the nodules were illustrated with root portions extending through the entire length of the pore to the base. These figures were intended to show the general feature of a nodule with a root portion. In fact the prior art process does not give a root that-extends throughout the entire length of the pore. The most clear evidence of this is that the oxide layer does not show the coloration typical of metal deposition at the base of the pore. If the growth of the nodule started at-the base, the article would exhibit coloration of the oxide layer at some point in the process. This does not occur in the formation of the nodules. The coloring process, which deposits metal at the base of the pore, generally takes a much longer time. The pores of the oxide are in fact much more slender and deeper than is illustrated in the figures. The ions which ultimately are reduced to form the metal deposit must be transported through a very long slender column. Additionally FIG. 1 depicts one nodule which is significantly, larger than an individual pore, with a, root portion extending into multiple pores. A nodule size which extends across multiple pores is a typical result of that art.

Figure 2:
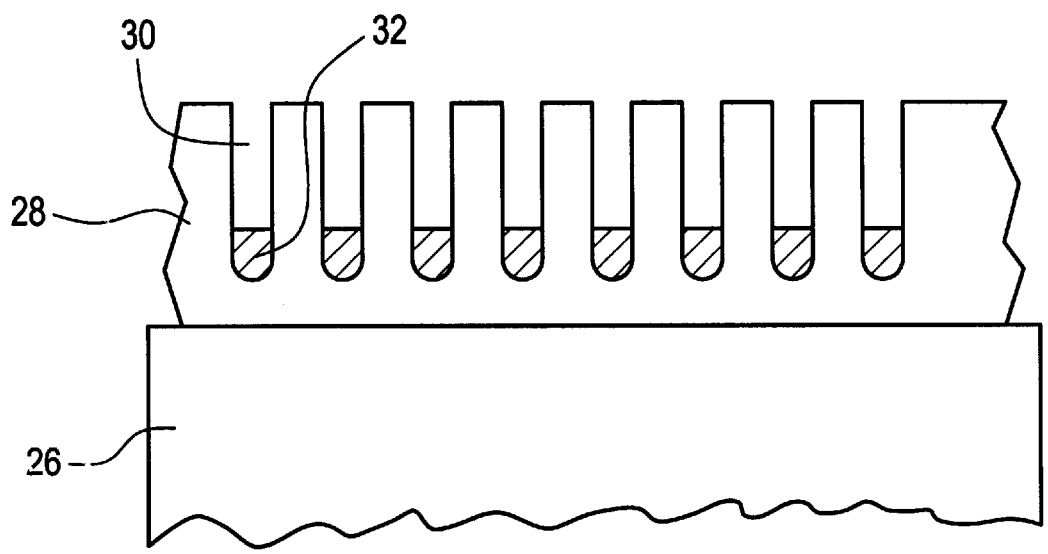
FIG. 2 is an enlarged cross-sectional view of a portion of a plate depicting a metal deposited in the base of the pores in an anodic oxide coating on a metal base.

The processes by which the metal can be deposited at the base of the Pores as in the present invention are known within the art of electrolytic coloring of anodized aluminum. The electrolytic coloring is most often accomplished with an alternating current. The use of direct current is also known, although it is much less frequently employed. An overview of the electrolytic coloring process can be found in the previously mentioned publication, "The Surface Treatment and Finishing of Aluminum and its Alloys" by S. Wernick, P. Pinner and P. G. Sheasby. Applications using several different metals are discussed in that publication. Among the examples referenced are cobalt, nickel, copper and tin to name a few. In general the electrolytes comprise a salt of the metal usually admixed with an acid such as sulfuric acid. The process naturally results in a metal deposit with dimensions and a distribution determined by the structure of the porous oxide. Each pore contains a metal deposit with a diameter approximating that of the pore. Thus the distribution frequency of the ultimate catalytic sites is determined by the number of pores per unit surface area. The diameter of these sites, being determined by the pore size, is on an order of about 50 to 300 Angstroms. This is illustrated in FIG. 2 wherein a similar anodizable metal substrate 26 has an unsealed, anodic oxide layer 28 formed thereon by conventional anodizing processes which form the pores 30. The metal 32 is then deposited into the base portion of the pore.

The difference in the two processes is illustrated in the following examples. An aluminum article is anodized in 150 g/l sulfuric acid at 10 amps for 30 seconds. It is subsequently made the cathode in a DC cell with an electrolyte comprising 5 g/l sulfuric acid and saturated copper sulfate and treated for 15 seconds. This article will have the bulbous nodules which are the intermediate step in the prior art and co-pending application. A second aluminum article is anodized in 250 g/l sulfuric acid at 10 amps for 3 minutes. This article is then made an electrode in an AC cell with an electrolyte comprising 7 g/l sulfuric acid and 20 g/l copper sulfate and treated for 4 minutes. This article has an oxide layer with the copper deposited at the base of the pores which serves as the intermediate step in the present invention. Although this second aluminum article is anodized for a longer period of time and has a thicker oxide layer, that is not essential to the present invention even though a thicker oxide layer tends to favor deposition at the base of the pores rather than the formation of nodules.

The electrolytic treatment of an anodic oxide in a direct current cell with an electrolyte containing a metal salt can also form a metal deposit at the base of the pore or alternatively can form a nodule as described in the previously mentioned co-pending patent application Ser. No. 08/502,121. The metal deposition process is influenced in part by the properties of the oxide layer (e.g., thickness, porosity). More importantly, the specific variables in the metal treatment cell will determine whether the metal will form nodules or deposit at the base of the pore. Concentration, temperature, voltage and current density will all have an impact on the outcome. In general, the formation of a metal deposit at the base of a pore requires a longer treatment time to get an adequate deposit than the time necessary to form the nodules. This is due in part to the fact that to deposit at the base, the metal ions must travel through the entire length of the pore to be reduced. To form a nodule near the surface, it is necessary only to cause the current to flow to the outer portion of the oxide. The prior art references cited previously disclose methods for achieving both results. The means of achieving either result are known to those skilled in the art of electrolytic treatment of anodic oxides.

Figure 3:
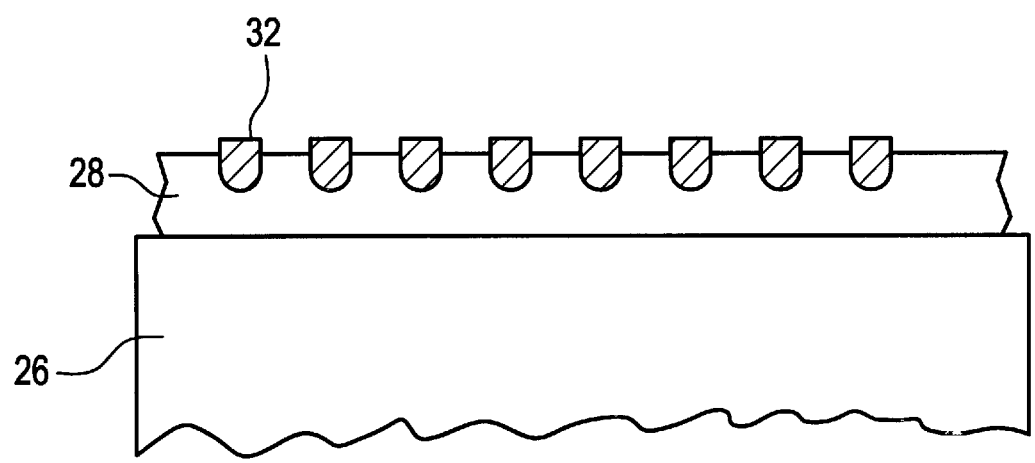
FIG. 3 is an enlarged cross-sectional view depicting the plate portion of FIG. 2 with a portion of the oxide coating stripped to expose the deposited metal at the surface of the oxide.

The oxide layer of the resultant article is then partially stripped to expose the deposited metal at the surface as shown in FIG. 3. This can be accomplished by conventional stripping solutions. For example, a bath which is comprised of 1 liter of water, 40 grams of chromium trioxide and 70 milliliters of 85% phosphoric acid may be used. The stripping process is allowed to proceed to the extent where the deposited metal is exposed but not completely removed. For example, in the case where copper is the deposited metal, the stripping of the oxide would be continued to a point where the aluminum substrate had the appearance of copper. At this point the surface consists of very small copper sites in the oxide film spaced at distances determined by the thickness of the walls of the anodic oxide between pores.

The metal deposited into the pores may initially be the catalyst metal or it can optionally be a base metal onto which the catalyst metal is then deposited. The deposition of the catalyst metal can be obtained, for example, if an electrolyte comprising a soluble salt of platinum or palladium is used in the electrolytic deposition process. This yields an article with either platinum or palladium deposited within the pore. The article obtained after the partial oxide stripping process is suitable for use as a catalytic body, having small discrete isolated catalytic platinum or palladium sites on the surface. In the case where the metal deposited into the pores is a base metal such as copper or nickel, the catalytically active metal is then deposited onto the base metal. One alternative is to subject the article to the second electrolytic deposition process prior to oxide stripping. In this way, the deposit within the pore consists of the base metal nearest to the base of the pore, and the catalytic metal deposited on the top of the base metal within the pore. After stripping the oxide to expose the metal at the surface, the discrete isolated sites serve as the catalytic sites. The second alternative is to strip the oxide to expose the based metal at the surface and then subsequently deposit the catalytic metal. This catalytic deposition may be carried out by electroplating methods-or by electroless chemical plating. In either case the deposition will take place preferentially on the exposed, discrete, isolated metal sites. Thus the catalyst can be dispersed at a size and distribution frequency determined by the oxide pore size and number. Alternately, the deposition of the catalyst metal may be allowed to continue such that the catalytic metal bridges the gaps between the base metal in the pores to thereby cover the entire surface. The resultant article would then have a catalyst layer over the entire surface anchored by the base metal in the pores.

In another alternative embodiment, a second anodizing process is utilized before exposing the deposited metal at the surface. The aluminum article is anodized to form the unsealed porous oxide and is then subjected to the electrolytic treatment to deposit the metal at the base of the pores. This is followed by the second anodizing process carried out in such a fashion that an additional oxide layer is formed beneath the metal deposit. This happens because the anodizing process forms the oxide at the interface between the substrate and the oxide layer that has already been formed. Therefore, the second anodizing step forms the additional oxide below the metal which has already been deposited in the pores. Alternatively, this second anodizing process may be carried out as a part of the electrolytic deposition process. Sheasby, et al, in U.S. Pat. No. 4,310,586 cite several examples where both the sequential and concurrent metal deposition and formation of additional anodic oxide beneath the metal deposit are described. An article prepared according to this process will have an appreciable oxide layer remaining on the surface of the aluminum article when the oxide stripping is conducted to expose the metal deposit at the surface. This article will possess a harder, more durable surface which might be advantageous in some catalytic applications.

Another aspect of the present invention is that the oxide may optionally be completely dissolved away to liberate the metal deposits completely from the surface. In this way, a very fine powder comprised of discrete catalyst metal particles is formed. This is analogous to the process as described in co-pending application Ser. No. 08/502,121.

In several patents in the art of aluminum coloring the technique of enlarging pores at their inner ends is disclosed. U.S. Pat. Nos. 4,066,816, 4,152,222 and 4,310,586 all make reference to processes where an aluminum article is, for example, anodized in sulfuric acid and subsequently treated in phosphoric acid to enlarge the pores at the base prior to the electrolytic deposition of the colorizing pigment. Such an enlarging process may optionally be incorporated within the scope of the present invention. In this way a catalytic site or particle with a size that might be better suited to some particular application can be obtained.

What is claimed is:

1. A method of forming a composite catalytic article comprising the steps of:
    a. forming an anodic oxide layer on a substrate metal surface, said anodic oxide layer having pores therein and said pores having base portions;
    b. subjecting said substrate with said porous anodic oxide layer thereon to the electrolytic deposition of a selected catalytic metal under conditions whereby said selected catalytic metal is deposited only in said base portions of said pores; and
    c. removing a portion of said anodic oxide layer and exposing said deposited catalytic metal at the,surface of said oxide layer.

2. A method as recited in claim 1 wherein said substrate metal surface is aluminum and said anodic oxide layer is aluminum oxide.

3. A method as recited in claim 1 and further including the step of enlarging said base portions of said pores prior to said step of electrolytic deposition of said catalytic metal.

4. A method as recited in claim 1 and further including the step of further anodizing said substrate after said step of electrolytic deposition of said catalytic metal thereby forming additional oxide between said deposited catalytic metal and said substrate.

5. A method as recited in claim 4 wherein said step of electrolytic deposition of said catalytic metal and said step of further anodizing said substrate are carried out simultaneously.

6. A method as recited in claim 1 wherein said step of electrolytic deposition of said catalytic metal is preceded by the deposition of a different base metal in said base portions of said pores and said catalytic metal is then deposited onto said base metal in said base portions.

7. A method as recited in claim 1 and further including the step of removing additional anodic oxide around said deposited catalytic metal whereby said catalytic metal deposits are liberated from said substrate.

8. A method of forming a composite catalytic article comprising the steps of:
    a. forming an anodic oxide layer on a substrate metal surface, said anodic oxide layer having pores therein and said pores having base portions;
    b. subjecting said substrate with said porous anodic oxide layer thereon to the electrolytic deposition of a base metal under conditions whereby said base metal is deposited only in said base portions of said pores;
    c. removing a portion of said anodic oxide layer and exposing said deposited base metal at the surface of said oxide layer; and
    d. subjecting said exposed deposited base metal at the surface of said oxide layer to the deposition of a catalyst metal onto said exposed deposited base metal, said catalyst metal being different from said base metal.

9. A method as recited in claim 8 wherein said substrate metal surface is aluminum and said anodic oxide layer is aluminum oxide.

10. A method as recited in claim 8 and further including the step of enlarging said base portions of said pores prior to said step of electrolytic deposition of said base metal.

11. A method as recited in claim 8 and further including the step of further anodizing said substrate after said step of electrolytic deposition of said base metal thereby forming additional oxide between said deposited base metal and said substrate.

12. A method as recited in claim 11 wherein said step of electrolytic deposition of said base metal and said step of further anodizing said substrate are carried out simultaneously.

13. A method as recited in claim 8 wherein said deposition of a catalyst metal comprises the deposition of said catalyst metal both onto and between said deposits of exposed base metal thereby covering the entire surface of said composite catalytic article.

* * * * *

UNITED STATES PATENT AND TRADEMARK OFFICE
CERTIFICATE OF CORRECTION

PATENT NO.    : 6,479,430 B1                                               Page 1 of 1
DATED         : November 12, 2002
INVENTOR(S)   : Fromson et al.

It is certified that error appears in the above-identified patent and that said Letters Patent is hereby corrected as shown below:

<u>Column 6,</u>
Lines 44-47, delete claim 7, as it was canceled on December 18, 1997.

Signed and Sealed this

Thirteenth Day of January, 2004

JON W. DUDAS
*Acting Director of the United States Patent and Trademark Office*